Figure 1:
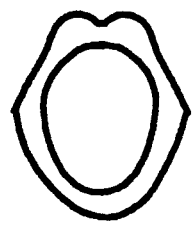

United States Patent [19]

Inouye et al.

[11] Patent Number: 5,286,205
[45] Date of Patent: Feb. 15, 1994

[54] METHOD FOR TEACHING SPOKEN ENGLISH USING MOUTH POSITION CHARACTERS

[76] Inventors: Ken K. Inouye; Sidney C. Sheres; Luna M. Inouye, all of 900 Wilshire Blvd., Ste. 702, Los Angeles, Calif. 90017

[21] Appl. No.: 942,021

[22] Filed: Sep. 8, 1992

[51] Int. Cl.⁵ ............................................. G09B 19/06
[52] U.S. Cl. ..................................................... 434/157
[58] Field of Search ............... 434/156, 185, 112, 167, 434/157

[56] References Cited

U.S. PATENT DOCUMENTS

| | | | |
|---|---|---|---|
| 660,255 | 10/1900 | Kingma | 434/185 |
| 4,121,357 | 10/1978 | Hoffman . | |
| 4,218,836 | 8/1980 | Acres | 434/185 |
| 4,460,342 | 7/1984 | Mills | 434/185 |
| 4,768,959 | 9/1988 | Sprague et al. | 434/156 |
| 4,913,539 | 4/1990 | Lewis | 352/87 |
| 5,111,409 | 5/1992 | Gasper et al. | 434/185 X |
| 5,149,104 | 9/1992 | Edelstein | 434/185 X |

FOREIGN PATENT DOCUMENTS 0186885  8/1991  Japan .................................. 434/157

Primary Examiner—Gene Mancene
Assistant Examiner—Jeffrey A. Smith

[57] ABSTRACT

This speech training system enables students to rapidly acquire and perfect their pronunciation of English phrases by speaking along with videos presenting English phrases accompanied by conventionally-spelled English text and characters representing the correct mouth positions. Students learn the mouth positions, then listen to a phrase, speak it simultaneously following the mouth position characters, and read the text. Students of this method can compare their mouth movements to a model of standard pronunciation visually and auditorily. Students of English thus have a more reliable audiovisual means of learning and practicing correct English pronunciation.

4 Claims, 4 Drawing Sheets

DRAWING FIGURES

Happy to meet you!

Thank you very much!

Wise men say

Only fools rush in,

But I can't help

Falling in love with you.

METHOD FOR TEACHING SPOKEN ENGLISH USING MOUTH POSITION CHARACTERS

BACKGROUND

1. Field of Invention

This is a method of teaching correct pronunciation of spoken American English to foreign-born people, in which they learn to synchronize their speech to recorded video presentations of speech which is accompanied by printed text, mouth movement characters, and tongue placement guides.

2. Prior Art

As the number of people in America who do not speak fluent English with correct pronunciation grows, efficient instruction of spoken English is more than ever a critical goal. English lessons including vocabulary, grammar, and pronunciation have traditionally been delivered via the spoken word, in classroom lectures and recently, in recorded audio media. The use of videotape in language instruction is now gaining credibility as American media become the dominant source of information for people around the world.

With regard to pronunciation instruction, educators in general have assumed that students' speech will improve as they learn to hear and repeat English speech. This listen-and-repeat approach has generally failed to show appreciable results for foreign-born students of English.

English speech consists of a stream of phonemes, each physically generated by a specific combination of lips, teeth, tongue, jaw, and voice. Correct movements of the speech mechanisms, therefore, are the behaviors critical to generating accurate English speech. Visual information about the mechanics of speech sound production are essential for foreign-born people to acquire English pronunciation. Active student participation adds an important kinesthetic component. Video presentation of speech instruction, with real-time feedback about students' performance, is an ideal format that greatly accelerates language learning.

Previous efforts to use visual pronunciation notation systems include Kingma, (U.S. Pat. No. 660,255) Acres, (U.S. Pat. No. 4,218,836) 1980, and Mills, (U.S. Pat. No. 4,460,342) 1984. None of these made use of video technology. Although Kingma, Acres, and Mills do print English text together with drawings of the shapes of the mouth, the present method features mouth position characters, and makes use of video technology a process whereby students hear and see the speech spoken and speak simultaneously along with presentations of the text, graphics, and sound.

The venerable Kingma used neither audio nor video in his method, and expected students to achieve speech accuracy primarily by following drawings. Acres' invention was intended for rehabilitation of articulation disabilities. Acres used 15 sketches of the human face and mouth with 10 additional instructional signs. That method introduced a mirror with overlaid sketches of the mouth for the patient to look at, but no sounds are spoken simultaneously with any models. That method was complex, required numerous sketches of a human face with mouth shapes and additional instructional signs. The mouth symbols were not named. They did not appear closely related to the letters that symbolize the associated sounds, nor to the actual appearance of the mouth when forming the sounds. The complex notations consumed a large space, were not easily printable, and are not currently in widespread use.

Mills invention was also designed for speech rehabilitation. Mills used a system of time intervals which aimed to represent the generation of speech sounds over time. Mills used several static sketches to represent the lips and tongue, purportedly in a continuum of movement similar to the frames of a film. These various sketches were not named, indistinct and difficult to distinguish one from another. These sketches were presented at times with audio, but did not provide that the student respond with simultaneous speech. English letters were printed in a variety of non-standard spelling conventions, which made the text difficult to decode. Like Acres, these notations covered a large space, were not easily printable, and are not currently in widespread use.

None of the known prior art has the major advantages of our speech training method, namely: a) the use of video; b) use of printable characters symbolizing mouth positions appearing close to corresponding English text; c) use of voice synchronization to accelerate learning by allowing students to employ their senses of sight and sound, simultaneously, to acquire and fine-tune English speech.

Objects and Advantages

Americans generally identify one another's educational and social status by one's ability to speak fluent English. Strong foreign accents limit communication because they draw attention to cultural distinctions, separating and dividing ethnic groups. Even when some exceptional foreign-born professionals become prominent in journalism, business, entertainment or government, their phonetically inaccurate English remains a handicap to be overcome.

Yet while everyone would agree that standard pronunciation is desirable, existing approaches to speech pronunciation improvement have had limited acceptance and effectiveness. The present invention uses new technology to create a widely accessible and effective method of overcoming speech deficiencies. It is the result of a process of testing and refinement in our model classroom for four years.

In our method, students learn to speak simultaneously with the video presentation, attempting to match their speech to a model as closely as possible. Using a mirror or split-screen video, students can see the differences in mouth and tongue shapes. Students can hear discrepancies when they are out-of-sync with the video model. Our use of voice synchronization accelerates the speech learning process by minimizing the short-term auditory and visual memory tasks. The presentations are repetitious, include prosody (intonation), and are in a rhythmical format so that students can anticipate the beginnings and ends of utterances and more easily synchronize with them. The repetitions allow more opportunities for practice, increasing the rate of learning.

This speech training system enables students to rapidly acquire and perfect their pronunciation of English phrases by speaking along with videos presenting English phrases accompanied by conventionally-spelled English text and characters representing the correct mouth positions. Students learn the mouth positions, then listen to a phrase, speak it simultaneously following the mouth position characters, and read the text. Students of this method can compare their mouth movements to a model of standard pronunciation visually and auditorily. Students of English thus have a more reliable audiovisual means of learning and practicing English with correct pronunciation.

BRIEF DESCRIPTIONS OF THE DRAWINGS

FIGS. 1-8: Mouth Position Characters

Figure 2:
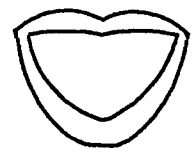
Figure 3:
Figure 4:
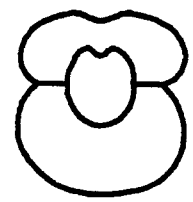
Figure 5:
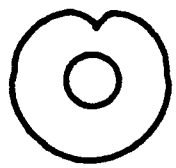
Figure 6:
Figure 7:
Figure 8:

These original characters are based on the actual shapes, appearances and formations made by the mouth when it forms the various sounds of English. The names of the characters are FIG. 1, Open; FIG. 2, Triangle; FIG. 3, Base; FIG. 4, Pucker; FIG. 5, O-shape; FIG. 6, Lips-in; FIG. 7, Bottom-lip-in; and FIG. 8, Closed.

Figure 9:
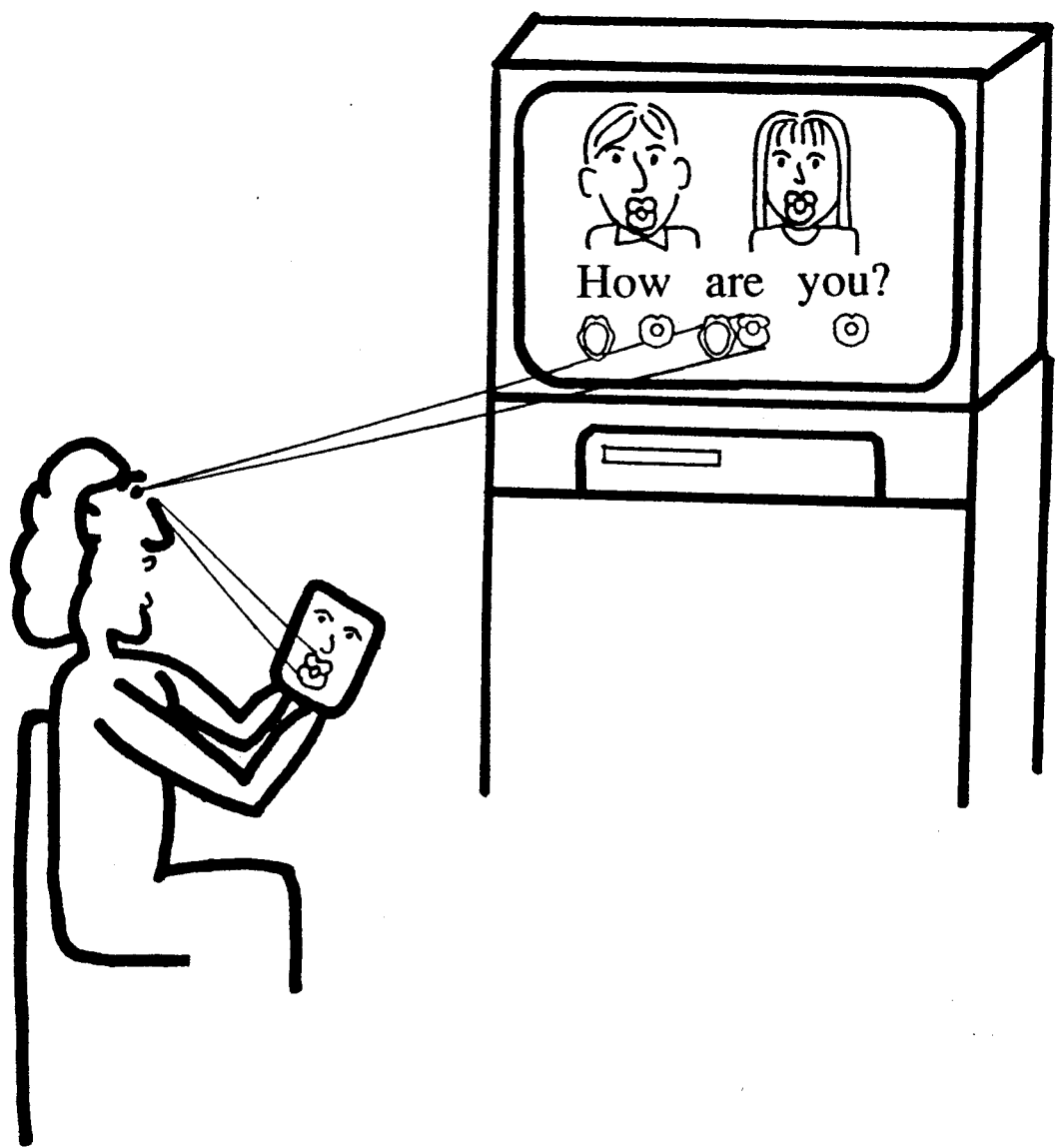

FIG. 9: Synchronizing with the video lessons

This figure suggests how students imitate the video model by follow the text and synchronizing their voice and speech movements using a mirror.

Figure 10:
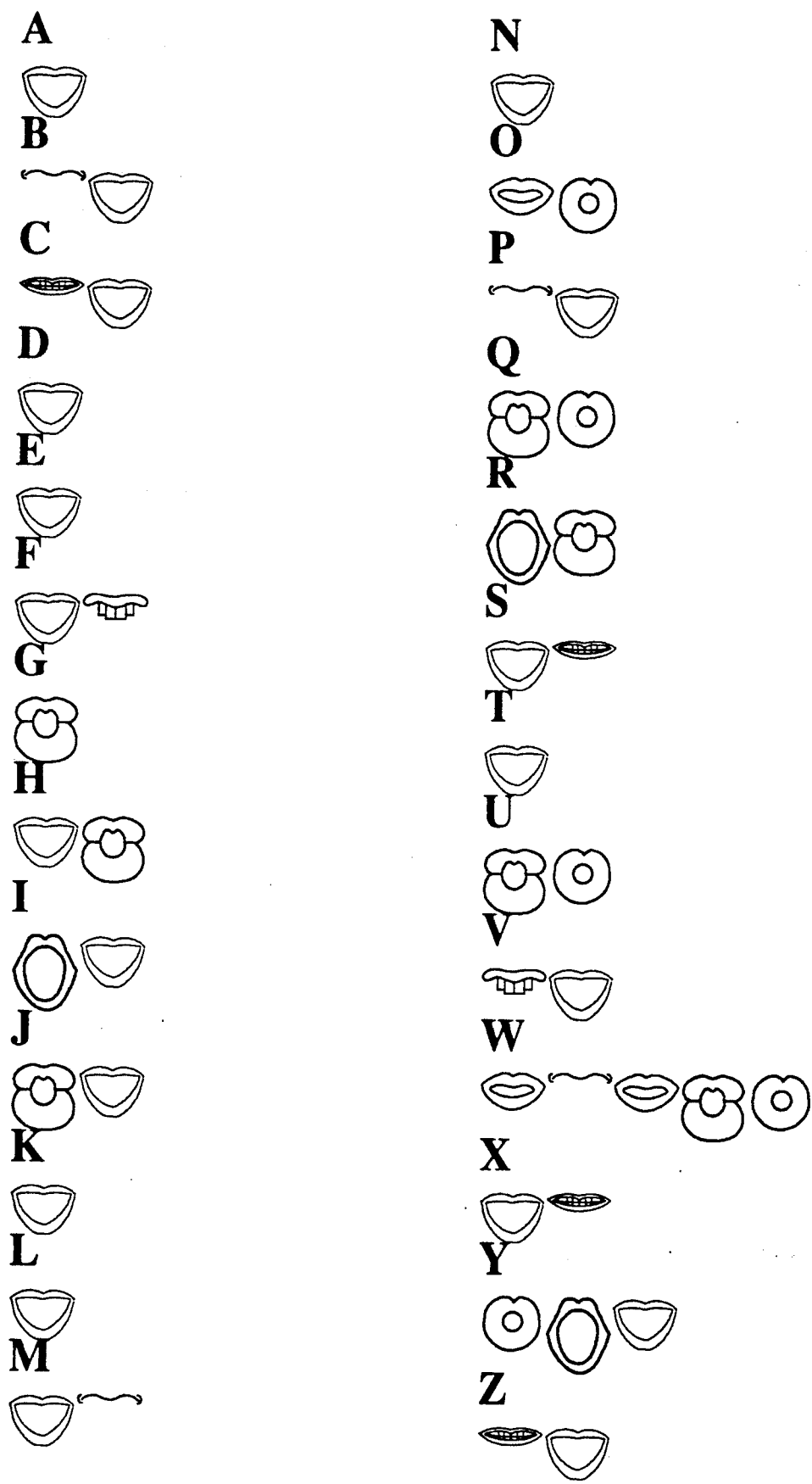

FIG. 10: The Alphabet by Mouth Positions

This figure shows how the names of the letters of the English alphabet are pronounced according to the present invention character system.

Figure 11:
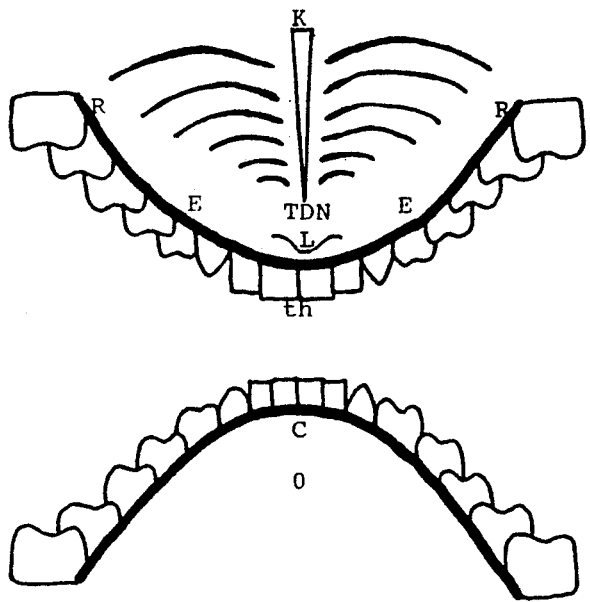

FIG. 11: Tongue Placement Chart

This view shows the mouth from the perspective of the inside of the mouth, looking out. It shows the disclosed method of describing the contact points, named according to where the tongue touches the teeth and gums to generate various English sounds. The names of the tongue placements are Zero, C, E, th, L, TDN, K, and R.

Figure 12:
Figure 12:
Figure 12:
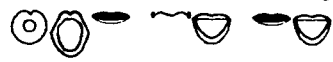
Figure 12:
Figure 12:
Figure 12:

FIG. 12: Sample of text printed with Mouth Position Characters

These words and phrases are shown accompanied by mouth position characters, which together, provide cues for the correct pronunciation of the spoken phrase or song lyric.

DETAILED SPECIFICATION

This new speech method presents video containing recorded speech together with close-up views of a model speaking English sounds, words, and phrases, accompanied by text and mouth position characters. These characters add physical representations of the speech mechanics to the written and spoken English. It includes a simultaneous student-response process that functions to accelerate learning of phonetically accurate English.

The method presents the configurations of lips, teeth, tongue, and jaw that physically create the desired phonemes. The sequence begins with a video presentation of a model demonstrating eight mouth positions, with their character symbols. Students sit in front of the video with a mirror and learn to form the shapes with their lips, teeth, and jaw. They learn to compare the shape of their mouth in the mirror to the model's mouth.

Mouth shapes are represented by 8 mouth position characters, named Open, Triangle, Base, Pucker, O-shape, Lips-in, Bottom-lip-in, and Closed (see FIGS. 1-8.) We formalized and standardized the characters so that each one can be stored and retrieved as an image in our computer video graphics system. This graphics system is capable of printing the characters on paper or video. Each mouth position character is shown in a distinct color. These characters are displayed with text in sequences that match the movements of the mouth during speech, placed beneath the letters that symbolize the sound associated with the movement.

In the same manner, students see a video presentation of a model showing eight tongue placements. They learn to place their tongues at the eight tongue placement points. The Tongue Placement Chart (FIG. 10) shows the contact points where the tongue touches the teeth and gums when forming English sounds. The tongue tip may point at the placement point or the tongue may be shaped so that the sides touch a placement point or a combination of tongue tip and side contact may be described. Tongue placements can appear with text, but for clarity of presentation, printed letters shown with mouth positions alone usually provide enough pronunciation information. By following the mouth position characters and tongue placement characters printed with text, students of English have a visual guide to speaking English words and phrases with correct pronunciation.

Once students learn the shapes, they learn to generate speech using these placements. Students practice generating these English phonemes in isolation, using a specific combination of lips, tongue, jaw, and voice. They speak these sounds repeatedly, in synchrony with the video models, so that they can compare sound as well as movement to achieve more exact imitation.

English words and sentences are of course composed of phonemes more or less continuously connected. Connected speech is taught as combinations of simple sounds, with movement of the mouth from position to position, accompanied by mouth position characters with text. Students develop fluency by speaking simultaneously with a model of the mouth positions on videotape. As students learn to form the individual mouth shapes and to move from position to position, there is a marked improvement in the sound of their speech.

Beyond the difficulty of acquiring the sound repertoire of English, students must learn when to use their newly-acquired phonemes. Pronouncing English from text alone is not reliable, since English is highly irregular in its sound/symbol correspondences. This method presents a system which enables students to improve their pronunciation of English phrases by following the models, accompanied by text and mouth positions.

In all cases, sounds are associated with mouth positions. But letters may represent different sounds in different words. For example, the letter combination th has the same mouth position and the same tongue placement virtually every time it appears. Other printed English letters, such as "o," have several sounds associated with them when used in different words, each of which sounds might need a distinct mouth position. For example, three different pronunciations of the letter "o," namely, ah, uh, and oh, are conveyed by the three different mouth position characters. By repetition, students gradually internalize the rules of English usage.

Another aspect of the disclosed method is the Sound Focus Activity, in which students have extensive rehearsal in generating certain speech sounds in words and phrases. They learn to follow the mouth and tongue positions as a means of achieving correct pronunciation of the target sound. They are then presented with several examples of the sound in use, for their practice. The result is drastic improvement in students' abilities to learn, to remember, and to accurately pronounce those and other words and phrases containing the target sound.

Another unique component of the present invention is the voice synchronization feature, which allows students to employ their senses of sight and sound, simultaneously, to fine-tune their English. In such voice synchronization, students speak simultaneously with the models, attempting to match their speech to the models as closely as possible. Using a mirror or split-screen video, students can see the differences in shapes and hear when they are not synchronized with the model. Voice synchronization minimizes the short-term auditory and visual memory requirement in the learning process and reveals to the student the discrepancies between his utterance and the video model. The result is more rapid acquisition of fluent and accurate speech.

PREFERRED EMBODIMENTS

Preferred instructional deliveries of the components of the present method are: videotape, motion pictures, music videos, and computer-presented instruction.

APPLICATION OF THE METHOD

English Language Instruction

The present method is used to accelerate the instruction of accurate English pronunciation to foreign-born people. It is also useful for eliminating regional dialects and achieving better pronunciation of standard American English.

What is claimed is:

1. A method of teaching spoken English to a non-English speaking student using a mirror and audio/video presentation by an audio/video presentation means containing recorded speech together with close-up views of a model speaking English, comprising the steps of:
   a. instructing said student to watch said views presented by said audio/video presentation means while comparing the shape of the model's mouth to the shape of the student's own mouth as viewed by said student in said mirror;
   b. instructing said student to view a video presentation of eight mouth position characters which indicate respective mouth movements, said mouth position characters being displayed in sequences that correspond to the movements of the mouth during speech, said mouth position characters displayed with accompanying text and placed beneath the letters of the text that symbolize the sound associated with the movement, said mouth position characters including: "Open", "Triangle", "Base", "Pucker", "O-shape", "Lips-in", "Bottom-lip-in", and "Closed", and;
   c. instructing said student to view a video presentation of eight contact points demonstrating where the tongue touches the teeth and gums when English target sounds are spoken.

2. The method described in claim 1, wherein said student speaks sounds in imitation of and in synchrony with the model and compares both the mouth positions of the student's own mouth in the mirror versus the mouth positions of the model and the sounds produced by the student's own mouth versus the target sounds produced by the model.

3. The method described in claim 1, wherein connected speech is taught as combinations of said target sounds, with movements of the mouth from position to position, accompanied by mouth position characters with text, whereby said student develops fluency by speaking simultaneously with said model demonstrating the speech and mouth positions.

4. The method described in claim 1, further including the step of:
   d. instructing said student to repeat steps a-c in order to practice following the mouth positions such that a more exact pronunciation of the target sounds is achieved.

* * * * *